United States Patent

[11] 3,545,679

[72] Inventors Patrick V. McAllister
     Salt Lake City;
     James D. McGregor, Logan, Utah
[21] Appl. No. 805,913
[22] Filed Sept. 10, 1968
[45] Patented Dec. 8, 1970
[73] Assignee Thiokol Chemical Corporation
     Bristol, Pennsylvania
     a corporation of Delaware
     Original application Nov. 17, 1964, Ser.
     No. 411,738, now Patent No. 3,419,441,
     dated Dec. 3, 1968. Divided and this
     application Sept. 10, 1968, Ser. No.
     805,913

[54] REFRACTORY ARTICLE
     8 Claims, 1 Drawing Fig.
[52] U.S. Cl. .................................................. 239/265.15,
                                                         239/591
[51] Int. Cl. ............................................ B64d 33/04
[50] Field of Search ............................... 60/200(A);
     239/265.15, 591; 148/6.3; 117/8, 161; 156/13

[56]                References Cited
              UNITED STATES PATENTS
1,142,172   6/1915   Jacoby ........................... 148/6.3X
1,949,094   2/1934   Waldschmidt ................... 148/6.3
2,789,958   4/1957   Fettes et al. .................... 117/161X
2,887,367   5/1959   Eisner ............................ 156/13
2,987,874   6/1961   Nicholson ...................... 60/200(A)UX
3,145,529   8/1964   Maloof ........................... 60/200(A)UX
3,156,091  11/1964   Kraus ............................. 60/200(A)UX
3,227,589   1/1966   Deutsch ......................... 117/8X
3,347,465  10/1967   Shieber .......................... 239/265.15
3,427,698   2/1969   Guzewicz ....................... 239/265.15
                  FOREIGN PATENTS
  599,275   3/1948   Great Britain .................. 239/265.15
  691,953   5/1953   Great Britain .................. 239/165.15

Primary Examiner—Lloyd L. King
Attorney—Thomas W. Brennan

ABSTRACT: A rocket motor nozzle throat insert assembly prepared from tungsten, said tungsten having surfaces coated with an oxide to improve its resistance to thermal shock upon subjection thereof to hot gases from a rocket motor combustion gases.

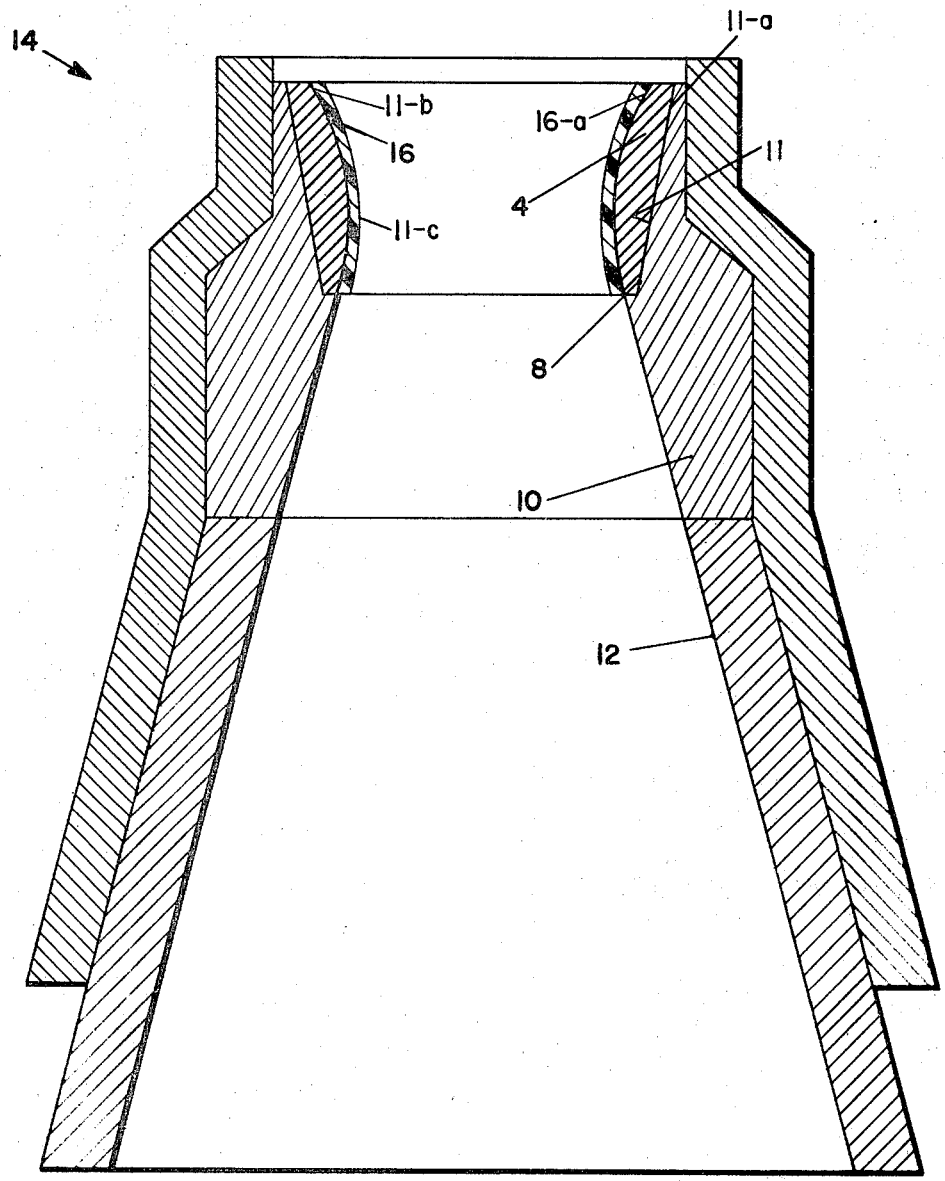

REFRACTORY ARTICLE

This application is a division of copending application Ser. No. 411,738, filed Nov. 17, 1964, now U.S. Pat. No. 3,419,441, granted Dec. 3, 1968, in the names of Patrick V. McAllister and James D. McGreor.

More particularly, this invention concerns tungsten-surfaced rocket nozzle inserts and to a method of treating said tungsten surfaces to improve their resistance to an environment of high temperature and erosion.

In the chemical process industries there is frequently a need for fabrication and construction materials which are resistant to erosion at high temperatures. For example, reactors, kettles, fractionating columns, combustion, furnaces and the like are all exposed to temperature as high as 3—4,000° F. and the ablative effect of particle laden gases.

Similarly in the aerospace industries, various gas generators and rocket parts are exposed to even higher temperatures as well as erosive combustion gases. Sometimes these temperatures are in the order of 5-6,000° F. and with new technology the trend is upward. At the same time pressures exerted by combustion particles are in the order of 1000 p.s.i.g. (pounds per square inch gauge or more. Since the thrust in rocket motors is generated by burning a fuel to form combustion gases and these gases pass through a sonic or supersonic nozzle, the nozzle plays a particularly important role in determining rocket performance. Because of its function as a conduit for combustion gases, the nozzle throat is vulnerable to high temperature ablative erosion. In attempting to overcome the ablative failure of key parts certain refractory metals have been used. These include tungsten, molybdenum and tantalum among others. Tungsten appears to be particularly attractive because it has several desirable characteristics. For example, tungsten has the highest melting point of all the refractory metals (6170° F.), it has good resistance to abrasive erosion and chemical corrosion and it has excellent strength at high temperatures.

Unfortunately, in actual testing, tungsten parts such as nozzle throats and inserts have not stood up and have shown severe limitations. For instance, tungsten parts as now formed are somewhat porous and are not good thermal conductors. Thus it has been the practice to support the nozzle throat with graphite members. These graphite members provide for additional mechanical reinforcement and act as a heat sink to give added heat capacity to the nozzle throat. This additional heat capacity serves to keep the temperature of the tungsten part below its melting point and permits using a minimal quantity of the extremely heavy tungsten. However, not only has the tungsten demonstrated a tendency to crack from thermal shock, but the graphite-supporting members have failed. Apparently at elevated temperatures but at temperatures substantially below those encountered during combustion, the graphite chemically combines with the tungsten to form brittle tungsten carbides whose melting points are lower than either graphite or tungsten. Furthermore, the brittle carbides tend to migrate away from the interface between the graphite and tungsten and thus fail to give the tungsten support. This in turn tends to increase the possibility of thermal fracture in the tungsten part.

Various attempts have been made to treat the tungsten to improve its resistance to thermal shock and its compatibility with the supporting graphite members. These have included impregnating tungsten with other metals such as copper (U.S. Pat. No. 3,145,529) and oxidizing the surface of the tungsten part to tungsten oxide. The former (alloying) method is objectionable since it is time consuming, greatly increases the cost of manufacture, introduces a copper, a metal subject to both corrosion and erosion into the nozzle throat and requires complex metallurgical techniques and equipment. Similarly while the oxidation of tungsten to the oxide has proved effective in reducing the incidence of thermal cracking in the tungsten nozzle throat, the incidence of the failure of the supporting graphite structure has sharply increased.

As the foregoing discussion indicates, up to this time no practical method is known for producing tungsten parts that are resistant to high temperature ablative attack yet which are compatible with graphite-supporting structures. The present methods of alloying and oxidation are not satisfactory for the reasons set forth. Thus an inexpensive method of treating tungsten parts to improve their resistance to high temperature ablative attack without causing graphite failure is much to be desired. Ideally such a treating process would be inexpensive to apply using conventional heat treating equipment and would retain the advantages of oxide coating.

Therefore it is an object of this invention among others to substantially improve the resistance of tungsten, and articles manufactured therefrom, to high temperature ablative attack.

It is a further object of this invention to develop the above characteristics in tungsten, and tungsten articles, inexpensively, without the need for special metallurgical techniques and equipment.

A related object of this invention is to provide an improved rocket nozzle assembly suitable for operation under high temperatures.

Yet a further object of this invention is to provide a method, and an article produced thereby, of selectively removing tungsten oxide from a tungsten oxide surface by chemical means which leaves a crack free, smooth surface.

Other objects of this invention will become apparent to those skilled in the art after a further reading of this patent application.

The above objects among others are accomplished by coating the surfaces of a tungsten article to be treated with an oxide coating ranging in thickness from about 3—6 mils, masking the surfaces that are to be exposed to high temperature ablative conditions with an alkali resistance inert coating, then selectively removing the uncoated oxide, until the unoxidized tungsten surface is exposed.

The tungsten article designated numeral 4 thus treated is seated upon a graphite-supporting member 10 so that the unoxidized tungsten and illustrated in the single figure of the drawing and a surface 11 forms the interface 11-*a* with the graphite support 10. Firing tests have indicated that the incidence of graphite cracking as well as failure of the treated tungsten nozzle throat 16 has substantially decreased since the partially oxidized parts are used. The alkali resistant coating 11-*c* is burned off during combustion of the fuel. There is some indication that the presence of the coating 11-*b* upon ignition decreases the incidence of cracking of the oxide coated tungsten 4 upon ignition, apparently the coating serves as a transient thermal insulator.

The preferred practice is to place the tungsten part 4 previously degreased with acetone, in a dead air furnace maintained at about 1,800° F. for about 50 minutes until a tungsten oxide coating 11-*b* of about 4 mils is produced. It is preferred that the part be positioned in the furnace so that it does not touch the walls and better yet that it be placed so that it is as far away from the walls as possible. If the size of the tungsten article 4 and the furnace permits it, it is desirable to position the tungsten part 4 so that no part of it is closer than 4 inches to a wall of the furnace. After about an hour of heating, the oxide 11-*b* coated article 4 is removed and is masked with an inert alkali resistant coating 11-*c* on the areas where no contact with the supporting graphite members 10 is to be had. The alkali resistant coating 11-*c* which is preferred is a mixture of an epoxy resin, (60—70 parts by weight) a low molecular weight liquid polysulfide (10—30 parts by weight) and an alkyl aminophenol curing catalyst (5—15 parts by weight). This mixture is applied to the tungsten oxide surface 11-*b* which is to remain intact, leaving the tungsten oxide surface 11-*b* where the graphite supporting member 10 is to be affixed, unmasked. In the preferred method, the masking coating 11-*c* is cured at room temperature (about an hour) to a hard surface and the oxide coating 11-*b* removed by alkali dissolution. The dissolution is accomplished by immersing the part in boiling, concentrated solution of sodium hydroxide in water, accompanied by scrubbing to remove all traces of the tungsten oxide surface 11-*b*. The cleaned surface is washed with water and dried to minimize accidental scratching of the tungsten surface. At this point the nozzle throat 16 is ready to be installed in the seat of the graphite support 10.

While the above discussion is relevant to the favored and preferred process embodiments, and much more latitude is possible in process conditions as can be seen below, it should be noted that it is also relevant to the refractory article 14 also described and discussed.

For example while acetone is the preferred degreasing solvent, any of the solvents normally used is satisfactory. These include the aliphatics such as pentane, the chlorinated aliphatics such as trichloroethylene and carbon tetrachloride, and chlorinated aromatics such as the chlorotoluenes and xylenes among others.

The oxidation of the tungsten part 4 is preferentially done in a dead air furnace at about 1800° F. However, the oxidation can take place in a circulating air furnace at temperatures ranging from about 1300 to about 2000° F. The heating time varies according to the temperature chosen between about 30—120 minutes.

An oxide coating 11-b of about 4 mils though preferred is not critical. A coating 11-b ranging from about 2 mils or more can be used if desired.

The term "epoxy resin," "epoxide resins" or "epoxy stock" as used herein describes glycidyl ethers formed by the reaction of polyhydroxy aromatic, cyclic or aliphatic compounds with a compound having one or more glycidyl radicals. Included within this definition are the diglycidyl ether of bis-phenol A or bis-phenol F as well as the diglycidyl ethers of halogenated bis-phenol A or halogenated bis-phenol F, or the higher molecular weight analogs of each. Also intended to be within the scope of the definition of the "epoxy resin," "epoxide resins" or "epoxy stock" as used throughout this application are the epoxy resins modified with other resins. For example, the glycidyl ethers of the bis-phenol A or bis-phenol F modified with phenolic resins as well as so called epoxy novolacs are intended to be within the inventive concept. Other liquid or solid resinous materials produced by suitable reactions of peracetic acid of hydrogen peroxide and formic acid on unsaturated aromatic or aliphatic materials having more than one epoxy group per average molecular weight can be included within the scope of epoxy resins. For example, the tetraglycidyl ethers such as the tetraglycidyl ethers of tetraphenylene ethane are encompassed within the inventive concept. Particularly of interest, however, are those epoxy resins produced by the condensation of bis-phenol A or bis-phenol F with epichlorohydrim under varying reaction conditions. These resins have an average of about two epoxy groups per average molecular weight. The above favored epoxy resins have an epoxy equivalent weight of from about 120 to 500.

The term "low molecular weight liquid polysulfides" as used throughout this patent application refers to those polymeric products of an essentially linear structure having a molecular weight of from about 800—12,000, resulting from condensing an alkaline polysulfide reactant and an organic dihalide reactant to form polymers included within the formula:

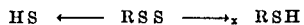

in which rare divalent alkylene radicals substituted and unsubstituted. These low molecular weight polymers are normally liquids at 25° C. typical organic dihalide reactants are alkylene dehalides such as ethylene dichloride and propylene dichloride haloethers such as (2-chloro-ethyl) ether, and miscellaneous composite such as di-2-chloroethyl formal, and chlorohydrous such as 1, 3-gylcerol dichlorohydrin and the like. A favored source of polysulfide polymer is produced by reacting sodium polysulfide with dichlorethyl formal (98 percent (Mole)) and trichloropropane (2 percent (Mole)) solvent under the usual polymergation conditions disclosed in U.S. Pat. Nos. 2,466,963, 2,195,380 and U.S. Pat. No. 2,206,643. The resultant polymer as the following characteristics:

Molecular weight (average)—300
Viscosity, poise—0.5
pH—5-6
Specific gravity (20/20)—1.23

The catalysts of this invention are amines of diverse structure including alkyl aminophenols of this included within the formula:

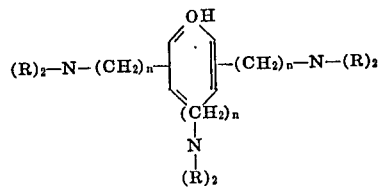

wherein R is an aliphatic radical and $n$ is an integer greater than O. The favored alkylaminophenol curing agent is 2, 4, 6- Tris (dimethy)-Aminomethyl) phenol, and amines such as ethylene diamine, diethylane triamine triethylamine tetramine, butylamine and the like.

Similarly, the thickness of the alkali resistant inert coating 11-c used to mask the tungsten oxide surface 11-b is not critical. It is preferred that the coating 11-c be about 4 mils thick, However, the thickness can range from about 2 or more mils in thickness without causing any problems.

The immersion of the partially masked, oxidized tungsten part 4 in an aqueous alkali solution is to "chemically mill" or remove the unmasked tungsten oxide 11-b so that a bare surface of tungsten part 4 is exposed. Other alkali metals such as lithium and or potassium hydroxide can be used instead of the preferred alkali, sodium hydroxide. The temperature of the alkali hydroxide bath is not critical. While boiling sodium hydroxide solution is preferred lower temperatures can be used although the time necessary for removal of the tungsten oxide is extended. As indicated the preferred process calls for supplementing the alkali treatment by brushing or scrubbing the unmasked tungsten oxide surface 11-b with a nonmetallic brush or scrubber. Again more vigorous brushing can be used or the scrubbing can be dispensed with at the expense of immersion time.

Alternatively the uncoated oxide 11-b can be removed by electropolishing. However, the electropolishing is not preferred because of its expense. The oxide 11-b can be removed by acid treatment but surprisingly enough it has been found that various acidic agents tended to attack the tungsten surface 11 and produce undesireable tiny cracks. For this reason acid treatment is not recommended.

To more specifically demonstrate the workings of the inventive process and the article 14 the following illustrative embodiments are submitted. The drawing shows a fragmentary section of a typical rocket throat 16 taken on the longitudinal axis of a typical solid propellant rocket motor.

In one embodiment a machined and ground annulus, insert or part 4 of forged tungsten and degreased using acetone, is placed in a dead air furnace of suitable dimensions so that at least 4 inches separates the part 4 from any side. The furnace is heated to 1800° F. The tungsten annulus, or insert 4 is left in the furnace for about 50 minutes. During this time, the oxide 11-b attains a thickness of 4 mils. The oxide coated annulus, or throat is cooled and masked in the portions that are to be exposed to the exhaust gases (and where no contact with the graphite-supporting member 10 is to be made) with an uncured masking composition. The composition of coating 11-c is composed of 70 percent by weight of an epoxy resin (ERL 2774), 20 percent by weight of a low molecular weight polysulfide having a molecular weight of between 300—800°, and a viscosity of 0.5 poise, and 10 percent weight of a 2, 4, 6 - tris (dimethylaminomethel) phenol.

The coating 11-c cures at room temperature within about an hour. At the end of this time the partially masked annulus is immersed in a boiling solution of 75g of NaOH in 100 ml of water. The annulus or throat insert 4 is removed and scrubbed with a brush at 5 minute intervals until all traces of tungsten oxide 11-*b* are removed from the unmasked oxide exposing the dull-gray surface of the base metal. Approximately 5 gallons of sodium hydroxide solution is required for each 1000 square inches of oxide having a thickness of 4—8 mils. The oxide cleaned surface 11 is washed several times with water and dried with care. The annulus or throat insert 4 is then ready to be installed in the seat 8 of the graphite support 10, defining the interface 11-*a* therebetween which is located on the interior of the rocket nozzle 14, upstream of the divergent cone or outlet 12. Part of the convergent cone or inlet 16-*a* may be formed by the annulus or throat insert 4.

In the related embodiment, a tungsten annulus or throat insert 4 is degreased using trichloroethylene solvent and is placed in a circulating air furnace of suitable dimensions. The tungsten part or throat insert or annulus 4 is placed in such a manner to be about 2 inches from the furnace sides. The furnace at the time the part 4 is inserted is maintained at about 1400° F. In the forced air atmosphere the desired 4 mil coating of tungsten oxide coating 11-*b* is formed in about 1 hour. The now oxidized tungsten part 4 is cooled and marked off to indicate where the supporting graphite member 10 would be affixed and all portions outside this area are coated with a masking composition 11-*c* of:

60 percent by weight of an epoxy resin having a epoxy equivalent weight of from 180 to 220.

30 percent by weight of a liquid polysulfide polymer having a molecular weight of 600 to 800, and a viscosity of 0.4 poise, 10 percent by weight of diethyline triamine curing agent, The coating 11-*c* is allowed to cure at room temperature and within an hour a hard coating 11-*c* is obtained.

The coated annulus 4 is immersed with scrubbing in a potassium hydroxide (50*g*) water solution (100 ml) kept at 80° F., until the oxide 11-*b* in the unmasked portion is removed. At the end of this time the part 4 is removed, washed with water and dried to produce a clean unwashed surface. A control part comparable to part 4 heated and coated under the same conditions is immersed in a hot hydrofluoric acid solution kept at 85° F. for 1 hour. At the end of this time the part was washed and dried. Inspection of the "acid" treated part 4 indicated a minutely cracked surface of tungsten where the graphite support 10 was to be affixed. This part failed upon testing in a simulated combustion test.

In a yet another embodiment a tungsten part 4 was treated in the furnace maintained at 2000° F. for 15 minutes, to obtain the oxidized coating 11-*b* then removed and cooled. The oxidized tungsten part 4 is then marked off to indicate where the graphite support 10 is to contact the exposed tungsten surface 8. The tungsten oxide 11-*b* in the marked area is removed by electropolishing to leave a smooth tungsten surface. The tungsten annulus 4 when seated as before performed satisfactorily upon test.

As indicated previously the novel process of this invention, the refractory article 4 is advantageous in several respects. For example, no special metallurgical techniques or equipment is required. In addition, the alkali removal of the tungsten oxide 11-*b* provides a smooth, crack free tungsten part 4 surface. In contrast acid removal of the oxide 11-*b* creates an unsatisfactory cracked surface. Other advantages of the present invention are low cost, a short treatment cycle and the use of unskilled personnel. Other advantages will become evident upon further reflection.

As the above discussion and the several embodiments indicate, this invention is capable of considerable modification insofar as the article of manufacture comprising a refractory device is concerned. The scope of the invention is best shown by the claims which follow:

We claim:

1. A rocket nozzle assembly comprising a graphite-supporting member, a throat annulus having an inlet and an outlet for passage of combustion gases therethrough, said annulus positioned in said supporting member to define a common interface therebetween, and having a portion of its outer surface of tungsten metal where it forms with said graphite supporting member said common interface and the remainder of said surface being coated with tungsten oxide, said tungsten oxide surface being further coated with an alkali resistant inert material.

2. The assembly of claim 1, wherein the alkali resistant inert coating on said tungsten oxide surface is a mixture of an epoxy resin and a polysulfide resin.

3. A nozzle throat insert for a rocket motor having an annular form, said annular form having an inlet and an outlet for passage therethrough of combustion gases from said motor and a surface exposed to said gases and a surface shielded from said gases; and, said exposed surface being coated with tungsten oxide and said shielded surface being unoxidized tungsten.

4. The throat insert of claim 3, wherein said exposed surface is first oxidized and then coated with an inert alkali resistant coating.

5. The insert of claim 4, wherein the inert alkali resistant coating is a mixture of an epoxy resin and a polysulfide resin.

6. A rocket motor nozzle assembly having a convergent cone and a divergent cone and a tungsten throat insert therein:

said insert being of annular form of tungsten metal;

said annularly formed insert positioned and supported in a graphite support member so that the surface thereof not supported by said member is exposed to rocket motor combustion gases and the surface supported by said member is shielded from said gases and said member defines with said supported tungsten surface a common interface therebetween; and, said tungsten surface exposed to said gases and not supported by said member is coated with tungsten oxide and the surface shielded from said gases and supported by said member is unoxidized to provide a crack-free tungsten surface thereat.

7. The nozzle assembly of claim 6, wherein the exposed, nonsupported and tungsten oxide surface is coated with an inert alkali resistant coating.

8. The nozzle assembly of claim 7, wherein the inert alkali resistant coating is a mixture of an epoxy resin and a polysulfide resin.